US006996615B1

(12) United States Patent
McGuire

(10) Patent No.: US 6,996,615 B1
(45) Date of Patent: Feb. 7, 2006

(54) HIGHLY SCALABLE LEAST CONNECTIONS LOAD BALANCING

(75) Inventor: Jacob M. McGuire, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1045 days.

(21) Appl. No.: 09/734,450

(22) Filed: Dec. 11, 2000

Related U.S. Application Data

(60) Provisional application No. 60/236,555, filed on Sep. 29, 2000.

(51) Int. Cl.
*G06F 15/173* (2006.01)
*G06F 9/46* (2006.01)

(52) U.S. Cl. ...................... 709/226; 709/225; 709/224; 718/105

(58) Field of Classification Search ................ 718/105; 709/224–226
See application file for complete search history.

(56) References Cited

U.S. PATENT DOCUMENTS 5,257,374 A * 10/1993 Hammer et al. ............ 718/105
5,495,426 A 2/1996 Waclawsky et al.
5,912,894 A 6/1999 Duault et al.
5,970,228 A * 10/1999 Nezu .......................... 713/200
6,038,212 A 3/2000 Galand et al.
6,072,773 A 6/2000 Fichou et al.
6,078,943 A * 6/2000 Yu ............................. 718/105
6,111,877 A 8/2000 Wilford et al.
6,119,143 A * 9/2000 Dias et al. .................. 718/105
6,178,160 B1 1/2001 Bolton et al.
6,246,669 B1 6/2001 Chevalier et al.
6,263,368 B1 * 7/2001 Martin ....................... 718/105
6,298,371 B1 * 10/2001 Ernst .......................... 718/104
6,542,964 B1 * 4/2003 Scharber ..................... 718/105
6,671,259 B1 * 12/2003 He et al. .................... 718/105
6,738,839 B2 * 5/2004 Sinha ......................... 718/105

OTHER PUBLICATIONS

Load balancing a cluster of web servers: using distributed packet rewriting Aversa, L.; Bestavros, A.;Performance, Computing, and Communications Conference, 2000. IPCCC '00. Conference Proceeding of the IEEE International , Feb. 20-22, 2000. pp.: 24-29.*

Design and practice of a dispatch server architecture Hong, H.C.; Chen, Y.C.;Distributed Computing Systems, 1999. Proceedings. 7th IEEE Workshop on Future Trends of , Dec. 20-22, 1999. pp.: 246-251.*

Glossary, Catalyst 484OG Software Feature and Configuration Guide, pp. 1-4.

Cisco, Understanding CSM Load Balancing Algorithms, Document ID: 28580, Updated Sep. 23, 2004pp. 1-4.

Linux Virtual Server, Job Scheduling Algorithms in Linux Virtual Server, Nov. 20, 1998, pp. 1-5.

* cited by examiner

*Primary Examiner*—Dung C. Dinh
*Assistant Examiner*—Aaron Strange
(74) *Attorney, Agent, or Firm*—Cesari and McKenna, LLP

(57) ABSTRACT

A load balancing device according to an embodiment of the invention uses a predictor that comprises a plurality of Least Connections Control Blocks (LCCBs) that keeps track of the real servers with active connections. To speed up the search for the real server with the least number of active connections, an LCCB is kept for each metric. A metric is defined as the number of connections on a server divided by its weight (or capacity) of the server. This metric is kept as a quotient/remainder pair. The predictor sends out the real server address with the lowest metric whenever a new connection is required by the load balancing device.

19 Claims, 6 Drawing Sheets

HIGHLY SCALABLE LEAST CONNECTIONS LOAD BALANCING

CROSS-REFERENCE TO RELATED APPLICATIONS

The present application claims priority from U.S. Provisional Patent Application Ser. No. 60/236,555, which was filed on Sep. 29, 2000, by Jacob M. McGuire for a HIGHLY, SCALABLE LEAST CONNECTIONS LOAD BALANCING and is hereby incorporated by reference.

BACKGROUND OF THE INVENTION

1. Field of the Invention

The present invention relates to load balancing traffic among a plurality of servers, and in particular, to a least connections load balancing method.

2. Background Information

Computer networks typically use file servers which frequently operate under a client-server paradigm. Under this model, multiple clients can make input/output (I/O) requests which are directed to a particular resource on the network. A server on the network receives and carries out the I/O requests. When the server receives multiple I/O requests, the server may choose to service them one at a time. I/O requests which are not being processed typically wait until the server is ready to receive more requests. As a result, the server can become a bottleneck in the network.

Typically, it is desirable to distribute various client requests among the plurality of servers. In these instances, it requires collaboration as to how the various client requests are to be distributed among those various servers. This may be performed through load balancing. Server load balancing allows for a group of real servers (a server farm) to be represented as a single virtual server entity wherein the traffic is balanced among the plurality of servers. One method to obtain server load balancing is to use a round-robin method. With this method, a new connection between a client and a real server is performed by choosing the real servers in a circular manner wherein a connection is made if the chosen server has capacity to handle the connection. However, the round-robin method does not insure that the various real servers are indeed effectively load balanced.

Another method for server load balancing is a least connections method in which a new connection is assigned to the real server with the least number of currently active connections. Compared with the round-robin method, the least connections method provides for a more accurate load balancing of the servers; however, it is rather complex and consumes a fair amount of processing time of the device that is performing the load balancing. For instance, the method sends a new connection to a server which has the lowest metric, wherein the metric is defined as the number of connections on the server divided by the weight (or capacity) of the server. This metric is kept as a quotient/remainder pair. To keep track of the metric and the remainder, integer division is typically performed on all servers every time a connection is added or removed.

On a different note, it is desired to flexibly increase the number of real servers as demand increases for resources at the server farm. However, one aspect of this problem is that as greater numbers of real servers are added, the load balancing process slows down, which may require replacing the load balancing device with one that processes at a faster speed. For instance, consider a method in which the load balancing device sequentially tests a list of servers for least connections. One reason for the slowdown may be that as the list of potential servers for connections increase, more time is needed for the device to find the server with the lowest number of active connections.

SUMMARY OF THE INVENTION

A load balancing device according to an embodiment of the invention uses a predictor that comprises a plurality of Least Connections Control Blocks (LCCBs) configured to keep track of the real servers with active connections. To speed up the search for a real server with the least number of active connections, an LCCB is kept for each server metric. A metric is defined as the number of connections on a server divided by the weight (or capacity) of the server. This metric is kept as a quotient/remainder pair. The predictor sends out the real server address with the lowest metric from the LCCB with the least connections whenever a new connection is required by the load balancing device. According to the embodiment, a list of metric/pointer pairs is kept by the associated LCCB, one corresponding to each real server, and when a connection is requested, the real server with the lowest metric is used for the connection which is pointed to by the pointer of the metric/pointer pair.

Each of the LCCBs is associated with a list of server metric/pointers that points to servers having a similar number of connections. Because the LCCBs are kept in sorted order (in terms of the number of connections in a server), finding the least loaded server is simply a matter of selecting the LCCB with the lowest connections and taking the first real server with the lowest metric (which is pointed to by the LCCB). The metric of the server is revised and the server metric/pointer is transferred to another LCCB which corresponds to the server's new number of connections. In particular, when a connection is added to the server, the remainder (which is also called a "slope") is incremented, and when a connection is removed, the slope is decremented. When the slope equals the weight, or goes below zero, the metric is updated and the slope reset.

As the number of connections of a real server changes, the server metric is removed from its current LCCB. Because the predictor creates/destroys connections sequentially, the request that a connection be created or destroyed occurs at most one at a time. Thus, if the connection of the real server changes, at most, the server metric/pointer is moved to one of the immediate LCCBs. For example, if a server metric/pointer is on the list of the LCCB having two connections and another connection is added to it, the metric is revised and that server metric/pointer is moved to an adjacent LCCB which is associated with three connections. The server metric/pointer is transferred to the new LCCB via a "double linked" connector, wherein the new LCCB subsequently updates and sorts its server metric/pointer list. The new LCCB then points to the server with the lowest metric. Conversely, if a server in the LCCB with two connections loses a connection, the metric is revised and the metric/pointer is moved to the adjacent LCCB which is associated with one connection. The LCCB transfers the server metric/pointer to the new LCCB via the double linked connector. The new LCCB then updates and sorts its server metric/pointer list and points to the server with the lowest metric.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
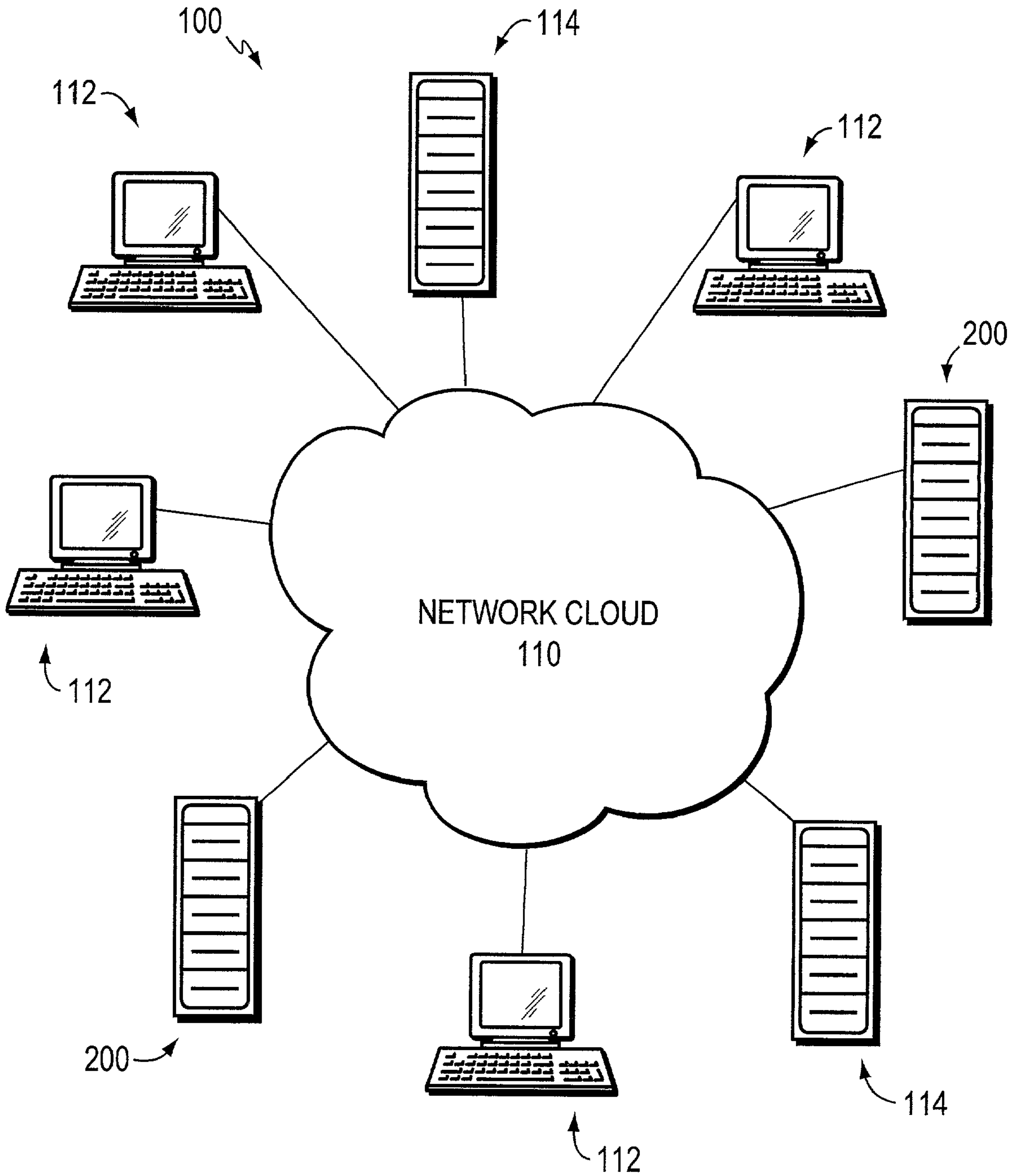
FIG. 1 illustrates a network in which the present invention may be implemented.

FIG. 1 shows an illustrative network 100 including a network cloud 110 which may be a combination of transmission lines, backbones, switches, routers and repeaters, dependent on the extent of the network, and allows various devices connected to the network to communicate with each other. These various devices may include simple computers such as personal computers (PCs) and workstations 112, (herein referred to as clients) that transmit or receive data, or they may be sophisticated servers 114 that store various resources. The network 100 may also include virtual servers 200, which operate in accordance with an embodiment of the present invention, to exchange data with clients 112. The network cloud 110, for instance, may be the Internet that interconnects large numbers of these simple computers, servers and virtual servers to facilitate the exchange of information. Information, in one example, flows in packets having attached headers that include, among others, source and destination addresses that inform the devices encountered in the network as to how the packets are to be forwarded so that they may reach their destination.

Figure 2:
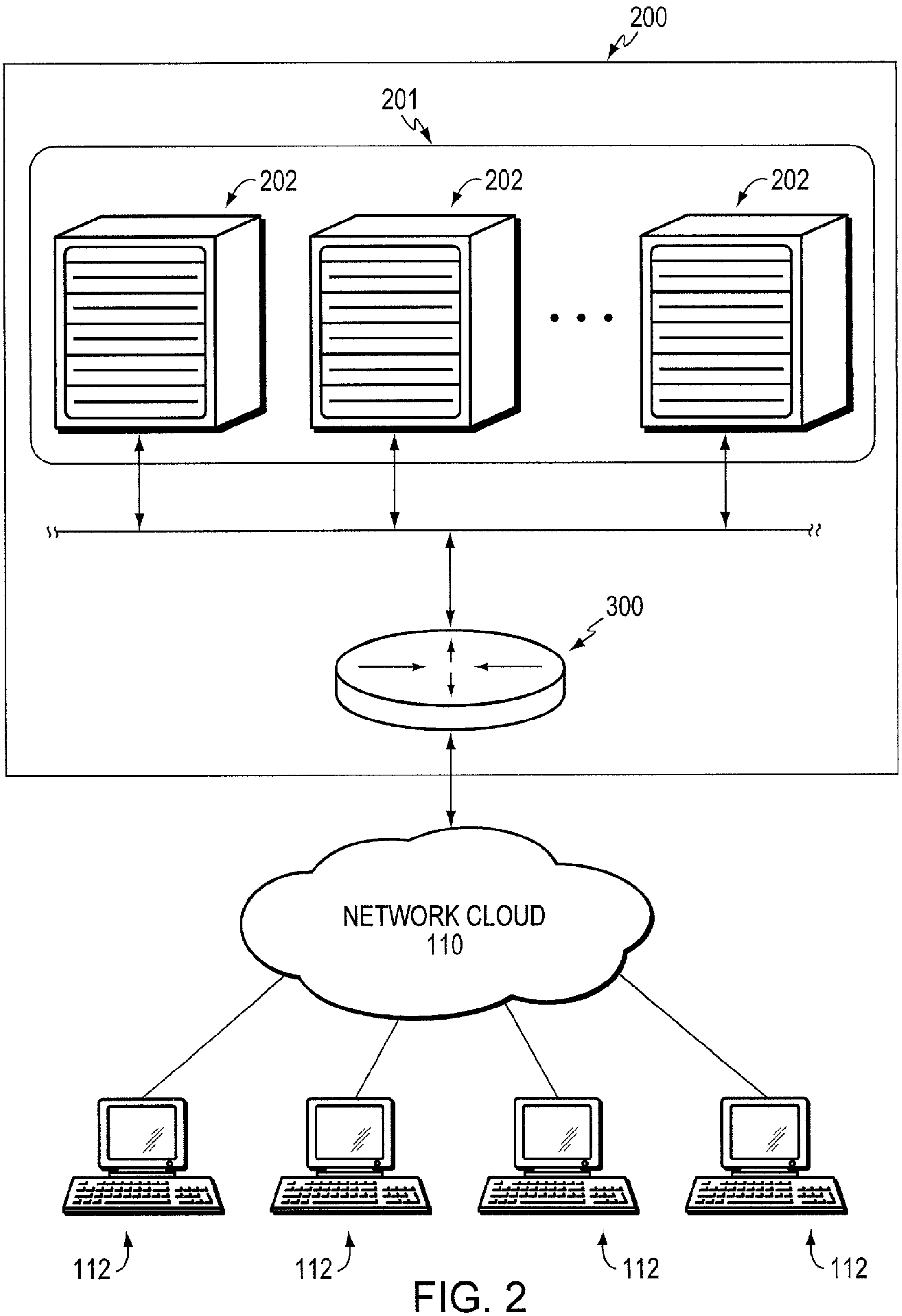
FIG. 2 illustrates a virtual server including a server farm and a load balancing device.

FIG. 2 is an exemplary virtual server 200 that includes a server farm 201 and a load balancing device 300 that provides for server load balancing and allows for clients to be represented by a group of network servers. From the clients' perspective, the virtual server 200 is a single server entity. One purpose of the virtual server is to facilitate scalability and to expedite resource availability for the clients. Moreover, the addition of new servers and/or the removal/failure of existing servers can occur at any time without affecting the resource availability provided by the virtual server. Server load balancing allows for traffic to be balanced among the servers and in certain instances, limit traffic to certain clients or servers. The servers that comprise the server farm 201 are herein referred to as "real servers" 202.

According to one embodiment, the clients 112 are configured to communicate with the virtual server 200 using an IP address that represents the virtual server (hereinafter referred to as "virtual IP address."). When a client 112 initiates a connection with the virtual server 200, this connection is received by a load balancing device 300 which, in turn, chooses a real server 202 from the server farm 201 using the novel load balancer (to be described herein). Although the load balancing device 300 is shown as being separate from the server farm 201, in another embodiment, it may be integrated into one of the servers 202 in the server farm 201.

Figure 3:
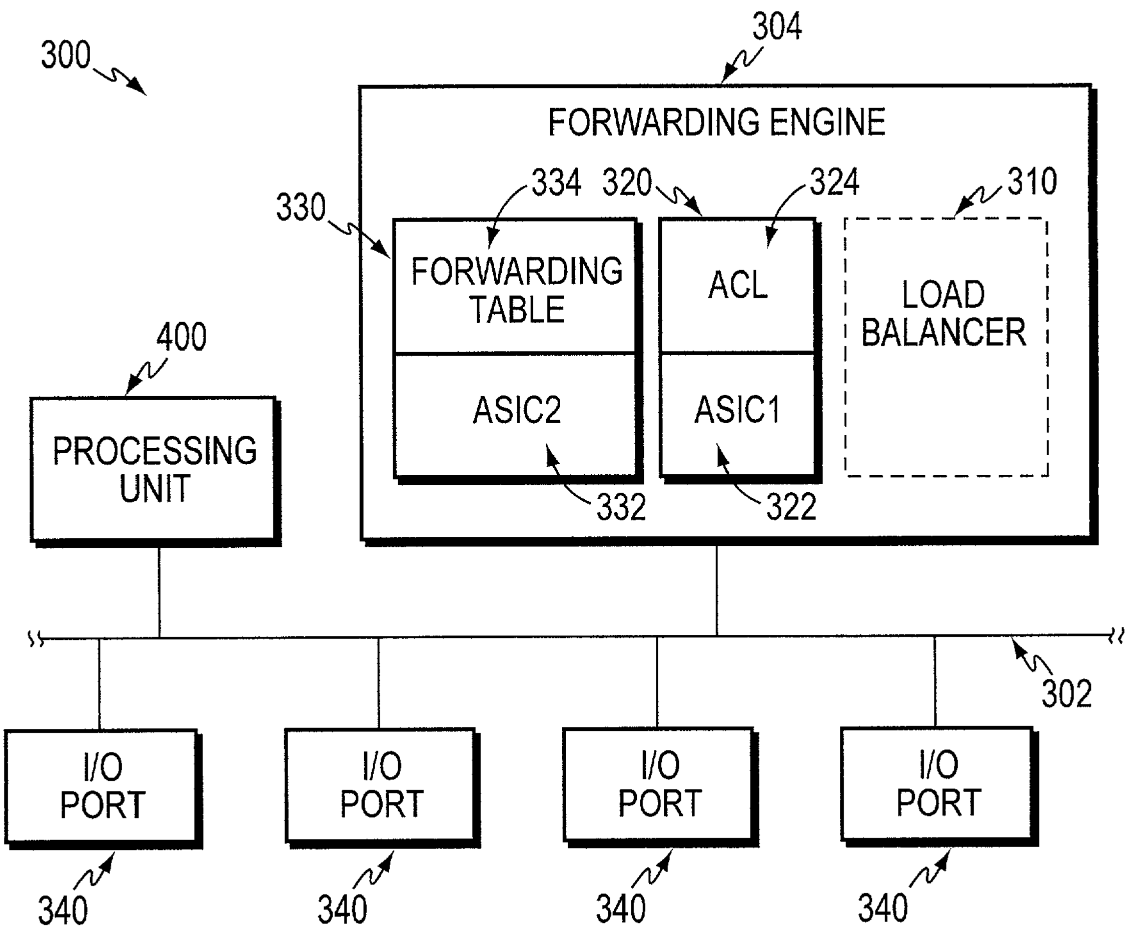
FIG. 3 is a schematic diagram of the load balancing device in which an embodiment of the invention may be implemented.

FIG. 3 is a diagram of an illustrative load balancing device 300, such as a switch, that directs traffic between the clients 112 and the real servers 202. The load balancing device comprises a processing unit 400, a forwarding engine 304 and a plurality of input/output (I/O) ports 340. The processing unit 400 may be a single processor or a plurality of processors that manage the load balancing device and execute, among other things, routing protocols. The processing unit 400 also executes a load balancing algorithm according to one embodiment of the invention. The forwarding engine 304 is a switch component that performs packet switching of packets received from the I/O ports 340, some of which are connected to the network cloud 110 and others of which are connected to the server farm 201. The load balancing device 300, in one embodiment, performs packet redirection (in another embodiment, it may be a packet translation) to and from the real servers 202 in the server farm 201 on traffic from clients requested through the virtual IP address. The load balancing device 300 uses a unique real server address to address a specific real server.

Communication between a client and a server farm is established by a "connection." A connection is a series of Internet Protocol (IP) packets associated with the same pair of IP addresses and the same Transport Control Protocol/User Datagram Protocol (TCP/UDP) ports. The information that describes packets belonging to a unique client/server connection and allows for a packet to be sent to and from a real server includes:

Source IP address;
Destination IP address;
Protocol;
Source TCP/UDP port;
Destination TCP/UDP port; and
IP address to forward the packet to.

The following example describes how a load-balanced TCP connection between a client and a server is processed by the load balancing device, which in this instance is a switch. The TCP protocol is connection-oriented and has known protocol messages for activation and deactivation of TCP sessions. Thus, under one method, a state machine is used to correlate TCP packets such as SYN, SYN/ACK, FIN and RST for realizing a connection is to be added/removed or for determining the number of connections per server. To expedite the load balancing process, an Access List Control 320 may be used to filter the TCP packets that indicate that a load balancing process is to take place.

During initiation of a connection, the client sends a TCP SYN packet using the virtual IP address. When the switch 300 receives this packet, it is passed through the Access List Control 320, wherein logic encoded as an Application Specific Integrated Circuit 1 (ASIC1) 322 compares the packet's header with an Access Control List (ACL) 324. The ACL 324 may be stored in a Random Access Memory (RAM) or a Content Addressable memory (CAM). The ACL 324 looks at the packet header to determine if the packet should be in the embodiment where the load balancer is constructed using ASIC technology and implemented in the forwarding engine 304, the SYN packet is sent to the load balancer 310 to be processed. In an alternative embodiment, where the processing unit 400 performs the load balancing, the SYN packet is marked with a software index that indicates that it is to be load balanced and is sent to the processing unit. Whether the load balancer is in the forwarding engine 304 or is in the processing unit 400 or is a separate component in the switch, its operation is similar. Thus, the embodiment in which the load balancer is implemented in a processing unit will be described herein. As the packet is redirected to the processing unit 400, the ASIC2 332 of the forwarding unit 330 creates a new flow instance in its forwarding table 334. A flow instance is an entry in the forwarding table that indicates where the packet should be forwarded to.

Figure 4:
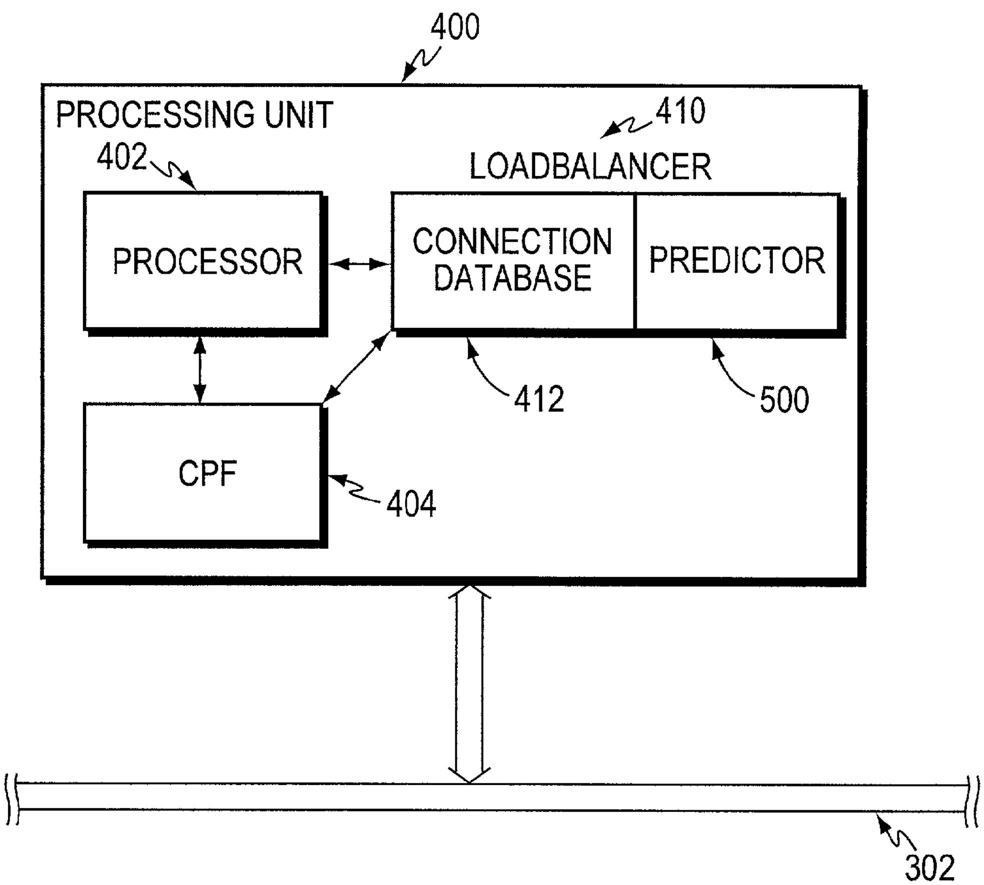
FIG. 4 is a schematic diagram of a processing unit of the load balancing device constructed in accordance with an embodiment of the invention.

Referring to FIG. 4, when the processing unit 400 receives the packet, the processor 402 sees that the index corresponds to load balancing, and processes the packet using a load balancer 410, which may be implemented in hardware or software. The load balancer 410 maps this index to a virtual server instance, decodes the packet and searches a connection database 412 to find a connection. If it fails to find a connection, the load balancer 410 chooses a real server (i.e., the server address) using a predictor 500 (which may be implemented in hardware or software) and creates a connection in the connection database 412. The predictor 500 will be further described herein. The chosen real server address is conveyed to the forwarding engine 304 as the SYN packet is placed on the bus 302. The forwarding engine 304 then "caches" the server address in the forwarding table 334 as the SYN packet is forwarded to the chosen real server.

The chosen server 202 responds with a TCP SYN/ACK packet. This packet is received by the switch 300 and is passed to the Access List Control 320. The ASIC1 322 redirects the packet to the processing unit 400 while marking it with a software index that indicates that it pertains to load balancing. Meanwhile, ASIC2 332 creates a flow instance in its forwarding table 334. Note that the forwarding unit 330 keeps two separate caches; one for the inbound packets and one for the outbound packets. Of course, this may be modified according to a desired result. The processor 402 in the processing unit 400 processes the packet using the load balancer 410 which maps this index to a virtual server instance, decodes the packet and finds the connection in the connection database 412. The client address is thus found and the packet is placed on the bus 302. Logic currently encoded on ASIC2 332, meanwhile, learns the client address for this flow and caches this in the forwarding table 334 as the SYN/ACK packet is forwarded to the client.

The client then sends a TCP ACK packet. When the switch 300 receives this packet, the ASIC1 322 does not find a match in the ACL 324 and permits the packet to be forwarded as opposed to redirecting it to the processing unit 400. Because the forwarding unit 330 has a flow entry in its forwarding table 334 for this flow, the forwarding engine 304 sends the packet directly to the associated real server 202.

TCP Data packets are now exchanged between the client and the server during this TCP session. Because the flags of interest i.e., SYN, FIN, and RST are not set on any of these packets, and the forwarding unit 330 has the flow entries in its forwarding table 334, the forwarding engine 304 sends the packets directly to the server or client without consulting the processing unit 400 (i.e., the load balancer).

Towards the end of the session, the client sends a TCP RST packet. When the switch receives this packet, the ASIC1 322 consults the ACL 324 to determine if it needs to be redirected. If so, the ASIC1 322 redirects the RST packet to the processing unit 400 while marking it with a software index that indicates that it pertains to load balancing. The processing unit 400 receives this packet and the processor 402 sees that the index corresponds to load balancing and maps this index to a virtual server instance, decodes the packet and finds the connection in the connection database 412. The connection is then removed from the connection database 412 and the memory space consumed by the connection is returned to the free connection pool.

The present invention also applies to a situation wherein the client sends a UDP packet. Because UDP is not a connection-oriented protocol, UDP protocol messages cannot be "sniffed" (without knowing details of the upper-layer protocol) to detect the beginning or the end of a UDP message exchange. In this instance, the detection of the UDP connection may be based on a configurable idle timer.

When the client issues a UDP packet using the virtual IP address and the switch 300 receives this packet, ASIC1 322 permits the packet to be forwarded since no matching entry exists in the ACL 324. Because the forwarding unit 330 does not have a corresponding flow in its forwarding table 334, it causes the ASIC2 332 to create a new flow and to forward the packet to the processing unit 400 where a lookup operation is performed to locate the route. The processing unit 400 receives this packet and because there is no software index that indicates load balancing, the processor consults a Common Packet Filter (CPF) 404. The CPF 404 forwards this packet to the load balancer 410 because it has a matching and best-fit packet filter. The load balancer 410 maps this index to a virtual server instance, decodes the packet, searches the connection database 412, and fails to find a connection. The load balancer then uses a predictor 500 to choose a real server, creates a connection, inserts it into the connection database 412, and starts the connection's idle timer. The real server IP address is found and this is used forward the packet on the bus 302. The ASIC2 332 learns the server address and caches this in the forwarding table 334 as the packet is forwarded to the chosen real server 201.

The chosen server 202 responds with a UDP packet. When the switch 300 receives this packet, the ASIC1's 322 decision is to simply permit the packet to be forwarded because there is no matching entry in the ACL 324 that indicates that it is to be load balanced. Because the forwarding unit 330 does not have a corresponding flow in its forwarding table 334, it causes the ASIC2 332 to create a new flow and forwards the packet to the processing unit 400 to lookup the route. The processing unit 400 receives this packet and since there is no software index that indicates that it is to be load balanced, the processor 402 causes the packet to be handled by the CPF 404. The CPF 404 forwards this packet to load balancer 410 since it has a matching and best-fit packet filter. The load balancer 410 maps this index to a virtual server instance, decodes the packet, finds the connection in the connection database 412, and ascertains the client's IP address. This IP address is used to forward the packet on the bus 302. Meanwhile, the ASIC2 332 learns the client's IP address while the packet is forwarded to the client.

UDP Data packets are exchanged between the client and the server using the same set of ports. Since ASIC1 322 simple permits the packets and the forwarding unit 330 has the flow entries in its forwarding table 334, the forwarding engine 304 sends the packets directly to the server or client. Eventually, the UDP connection will become idle for a period of time exceeding the idle timer. At this point, the load balancer 410 will timeout the connection.

Figure 5A:
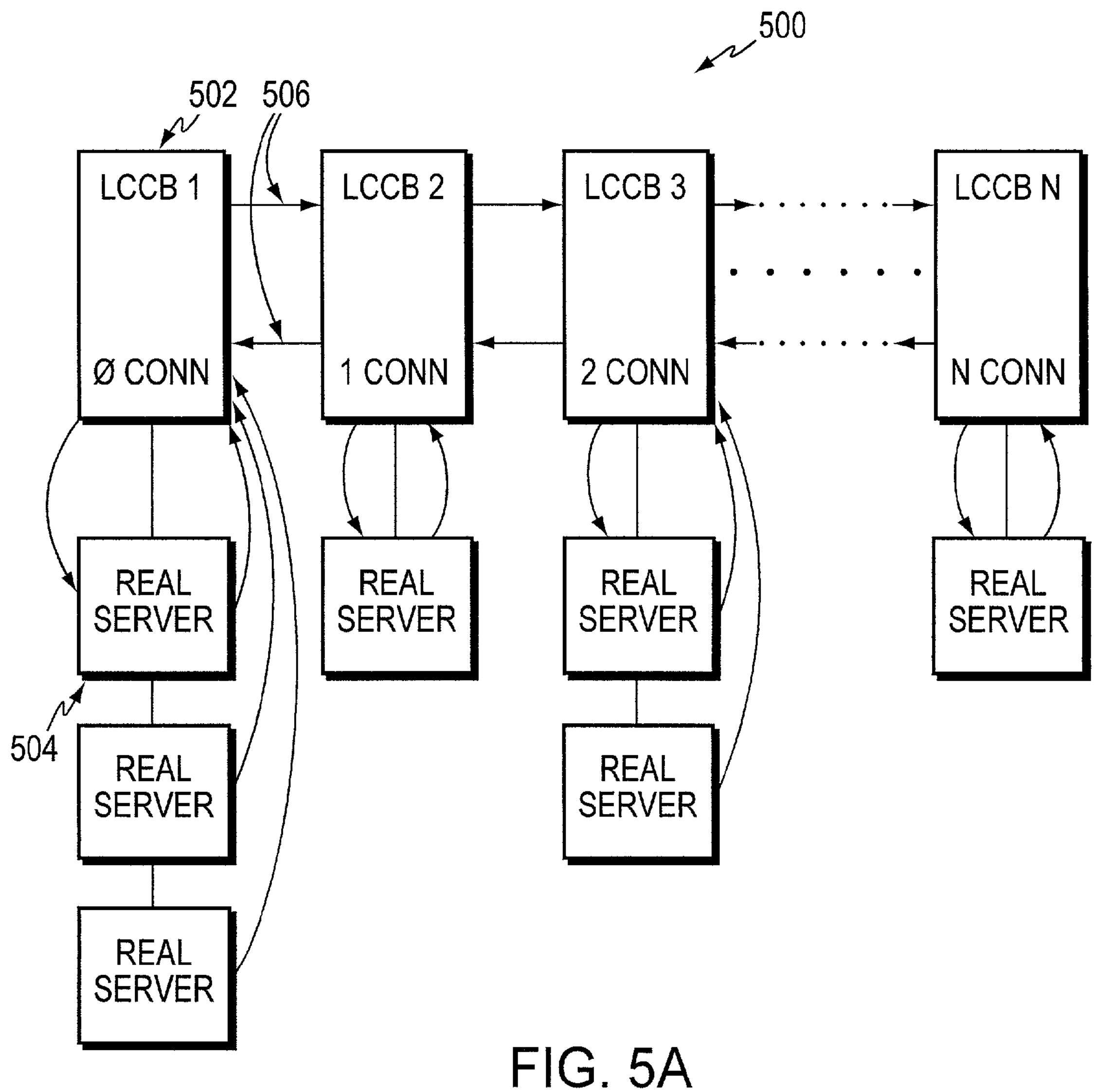
FIG. 5*a* is a predictor constructed in accordance with an embodiment of the invention.

FIG. 5*a* shows an exemplary predictor 500 constructed in accordance with an embodiment of the invention. The predictor 500 may be constructed using hardware (such as ASIC) or software. The predictor comprises a plurality of Least Connections Control Blocks (LCCBs) 502 that keeps track of real servers with active connections. To speed up the search for the real server with the least number of active connections, an LCCB is kept for each server metric. A metric is defined as the number of connections on a server divided by its weight (or capacity) of the server. This metric is kept as a quotient/remainder pair. The predictor 500 sends out via a selector 508 the real server address with the lowest metric from the LCCB with the least connections whenever a new connection is required by the load balancer 410. According to the embodiment, a list of metric/pointer pairs 504 is kept in a memory of the associated LCCB, one corresponding to each real server 202, and when a connection is requested, the real server with the lowest metric is used for the connection which is pointed to by the pointer of the metric/pointer pair.

Each of the LCCBs is associated with a list of server metric/pointers that points to servers having similar number of connections. Because the LCCBs are kept in a sorted order (in terms of the number of connections in a server), finding the least loaded server 202 is simply a matter of the selector 508 selecting the LCCB with the lowest connection and taking the first real server with the lowest metric (represented by the metric/pointer pair 504) which is pointed to by a pointer 506 of that LCCB. As the real server address is supplied to the load balancer, the metric of the server is revised and the server metric/pointer 504 is transferred to another LCCB (while that metric/pointer pair is removed from the LCCB's metric/pointer pairs list). The LCCB then points to the next server metric/pointer 504 on the list. The server metric/pointer is transferred to another LCCB which corresponds to the server's number of connections. In particular, when a connection is added to the server, the remainder (which is also called a "slope") is incremented, and when a connection is removed, the slope is decremented. If the slope becomes equal to the weight, or goes below zero, the metric is updated and the slope reset.

As the number of connections of a real server changes, its corresponding metric/pointer is removed from its current LCCB. Because the predictor creates/destroys a connection sequentially, the request that a connection be created or destroyed occurs at most one at a time. Thus, if the connection of the real server changes, at most, the server metric/pointer is moved to one of the immediate LCCBs. For example, if a server metric/pointer is on the list of the LCCB with two connections and another connection is added to the server, the server metric/pointer is revised and is moved to the adjacent LCCB associated with three connections. The server metric/pointer is transferred to the new LCCB via the double linked connector, wherein the new LCCB then updates and sorts its server metric/pointer list. The new LCCB then points to the server with the lowest metric. Conversely, if a server with a two connection loses a connection, its corresponding metric/pointer pair is revised and is moved to the adjacent LCCB which is associated with one connection. The LCCB transfers the server metric/pointer to the new LCCB via the double linked connection. The new LCCB then updates and sorts its server metric/pointer list and points to the server with the lowest metric.

Figure 5B:
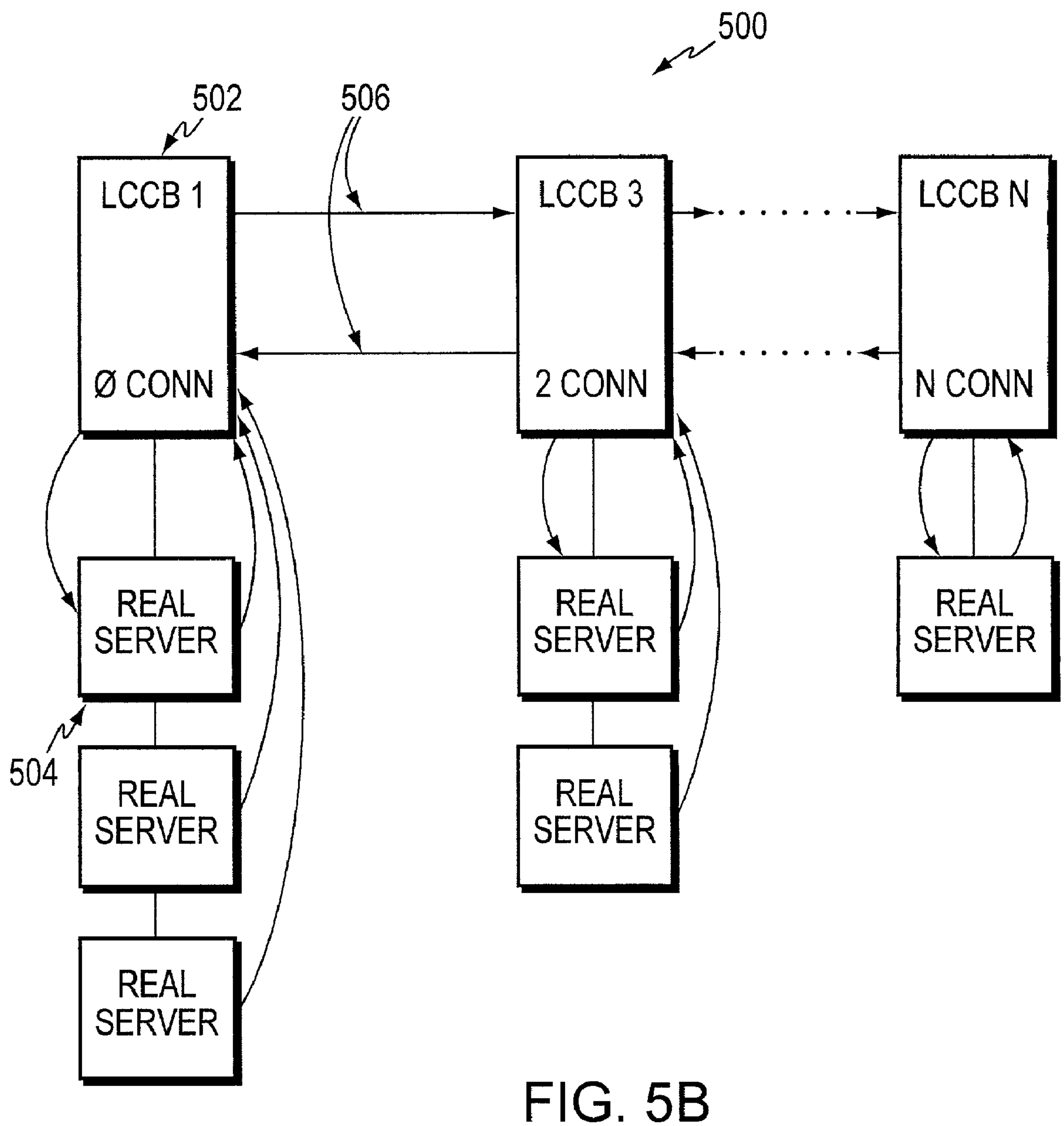
FIG. 5*b* is the predictor of FIG. 5*a* in which a redundant Least Connections Control Block (LCCB) has been removed in accordance with an embodiment of the invention.

To further expedite the process and to conserve resources, it is desired that for LCCBs that do not have an active server metric/pair to be removed altogether to conserve memory allocation. In the case of the load balancing device that is implemented in hardware, the redundant LCCBs can be deactivated (i.e., powered down). Take the example where the server with one connection has lost that connection. Its corresponding metric/pointer is transferred to the LCCB with no connections. In this instance, the LCCB with one connection no longer has any server metric/pointer to keep track of. In such cases, it is desired to remove/shutdown the LCCB to conserve memory allocation and software processing time, the result which is shown as FIG. 5*b*. Referring to FIG. 5*b*, in the event that the LCCB with one connection has a connection added to one of the servers pointed to by a metric/pointer on its list, that server now has two connections. However, the LCCB with two connections does not exist. In this instance, a new LCCB with two connections is created and the metric/pointer of the real server is added to the list of that control block. In the case where the load balancing device is implemented in hardware, the LCCB can be powered up to receive the metric/pointer pair.

As a performance enhancement we attach the current "best real server" and its metric and only search for a new real server when the metric of the current best real server increases or the metric of another real server is incremented below the current metric of the real server. Note that new servers may be added or a failed server may be removed without affecting the performance of the predictor and thus the load balancer. This is because finding the least loaded server is a simple matter of looking at the first LCCB with the least connections and finding the server pointed to by the LCCB. A method and apparatus of providing a highly scalable least connections load balancing has been described. It will however be apparent that other variations and modifications may be made to the described embodiment, with the attainment of some or all of their advantages. Therefore, it is the object of the appended claims to cover all such variations and modifications that come within the true spirit and scope of the invention.

What is claimed is:

1. A method for load balancing a plurality of servers, the method comprising:

providing a plurality of control blocks, each control block associated with a number of active connections a server is connected with, the control block configured to control at least one server with the associated number of connections in a server list;

determining a metric for each server by dividing the number of connections on the server by the capacity of the server wherein the metric is kept as a quotient/remainder pair;

storing the quotient/remainder pair in the control block;

incrementing the remainder by one for every connection added to the server;

decrementing the remainder by one for every connection removed from the server;

causing each control block to point to a server with a lowest value of the metric;

selecting the control block associated with the least number of connections; and selecting the server pointed to by the control block.

2. The method as in claim 1, further comprising:

causing the control block with the server having an added/removed connection to transfer the server to an adjacent control block, wherein the adjacent control block is associated with the number of connections pertaining to the transferring server;

causing the control block to transfer the metric of the server to the adjacent control block; and updating the pointer to point to the next server on the list of the control block.

3. The method as in claim 2, further comprising:

removing the control block if the control block does not have a server on the server list.

4. The method as in claim 2, further comprising:

causing the adjacent control block to receive the transferring server;

causing the adjacent control block to receive the metric of the transferring server; and causing the adjacent control block to update and sort the server list.

5. The method as in claim 4, further comprising:

adding a control block if there is no control block associated with the number of connections of the transferring server.

6. A computer readable medium comprising:

instructions for execution on a processor for the practice of a method for load balancing a plurality of servers, the method having the following steps, providing a plurality of control blocks, each control block associated with a number of active connections a server is connected with, the control block configured to control at least one server with the associated number of connections in a server list;

determining a metric for each server by dividing the number of connections on the server by the capacity of the server, wherein the metric is kept as a quotient/remainder pair;

storing the quotient/remainder pair in the control block;

incrementing the remainder by one for every connection added to the server;

decrementing the remainder by one for every connection removed from the server;

causing each control block to point to a server with a lowest value of the metric;

selecting the control block associated with the least number of connections; and selecting the server pointed to by the control block.

7. The computer readable medium as in claim 6, further comprising instructions for:

causing the control block with the server having an added/removed connection to transfer the server to an adjacent control block, wherein the adjacent control block is associated with the number of connections pertaining to the transferring server;

causing the control block to transfer the metric of the server to the adjacent control block; and updating the pointer to point to the next server on the list of the control block.

8. The computer readable medium as in claim 7, further comprising instructions for:

removing the control block if the control block does not have a server on the server list.

9. The computer readable medium as in claim 7, further comprising instructions for:

causing the adjacent control block to receive the transferring server;

causing the adjacent control block to receive the metric of the transferring server; and causing the adjacent control block to update and sort the server list.

10. The computer readable medium as in claim 9, further comprising instructions for:

adding a control block if there is no control block associated with the number of connections of the transferring server.

11. A load balancing apparatus comprising:

a plurality of control blocks, each control block associated with a number of active connections a server is connected with, the control block configured to control at least one server with the associated number of connections;

a metric of the server, kept as a quotient/remainder pair, wherein the remainder is incremented by one for every connection added to the server, and the remainder is decremented by one for every connection removed from the server;

a memory to store the quotient/remainder pair;

a pointer in each control block that points to a server with a lowest value of the metric; and a selection circuit that selects the control block associated with the least number of connections and further selects the server pointed to by the control block.

12. The load balancing apparatus as in claim 11, further comprising:

the control block configured to transfer the server having an added/removed connection to an adjacent control block, wherein the adjacent control block is associated with the number of connections pertaining to the transferring server;

the control block further configured to transfer the metric of the server to the adjacent control block; and the control block configured to update the pointer to point to the next server on the list of the control block.

13. The load balancing apparatus as in claim 12 further comprises:

the control block is de-activated if the control block does not have a server on the server list.

14. The load balancing apparatus as in claim 12, further comprises:

the adjacent control block configured to receive the transferring server; and the adjacent control block further configured to receive the metric of the transferring server, wherein the adjacent control block updates and sorts the server list.

15. The load balancing apparatus as in claim 14, further comprises:

a control block that is activated to receive the transferring server if there is no control block associated with the number of connections of the transferring server and the control block is associated with the number of connections of the transferring server.

16. An apparatus for load balancing a plurality of servers, the apparatus comprising:

means for providing a plurality of control blocks, each control block associated with a number of active connections a server is connected with, the control block configured to control at least one server with the associated number of connections in a server list;

means for determining a metric for each server by dividing the number of connections on the server by the capacity of the server, wherein the metric is kept as a quotient/remainder pair;

means for storing the quotient/remainder pair in the control block;

means for incrementing the remainder by one for every connection added to the server;

means for decrementing the remainder by one for every connection removed from the server;

means for causing each control block to point to a server with a lowest value of the metric;

means for selecting the control block associated with the least number of connections; and means for selecting the server pointed to by the control block.

17. A method for load balancing a plurality of servers, the method comprising:

associating each of the plurality of servers with one of one or more control blocks, each control block representing a number of connections of the associated servers;

determining a metric for each associated server by dividing the number of connections on the server by an assigned weight of the server, wherein the metric is kept as a quotient/remainder pair;

storing the quotient/remainder pair in the control block;

incrementing the remainder by one for every connection added to the server;

decrementing the remainder by one for every connection removed from the server;

pointing, within each control block, to a server with a lowest value of the metric;

selecting the control block associated with the least number of connections; and selecting the server pointed to by the control block.

18. The method as in claim 17, wherein the assigned weight represents a server's capacity to handle connections.

19. A system for load balancing a plurality of servers, the system comprising:

one or more clients to send client requests; and a virtual server to receive and process the client requests, the virtual server having, A) a plurality of real servers, and B) a load balancing apparatus to receive the client requests and load balance the client requests among the plurality of real servers, the load balancing apparatus further having, i) one or more control blocks, each of the plurality of real servers associated with one of one or more control blocks, each control block representing a number of connections of the associated servers, ii) a metric for each associated server, kept as a quotient/remainder pair, wherein the remainder is incremented by one for every connection added to the server and the remainder is decremented by one for every connection removed from the server, iii) a memory to store the quotient/remainder pair, iv) a pointer within each control block that points to a server with a lowest value of the metric, and v) a selection circuit that selects the control block associated with the least number of connections and further selects the server pointed to by the control block.

* * * * *